United States Patent
Haupt et al.

(10) Patent No.: US 8,262,534 B2
(45) Date of Patent: Sep. 11, 2012

(54) TRANSMISSION DEVICE WITH AT LEAST ONE PLANETARY GEARSET AND A FRICTIONAL SHIFT ELEMENT

(75) Inventors: Josef Haupt, Tettnang (DE); Martin Brehmer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 633 days.

(21) Appl. No.: 12/496,797

(22) Filed: Jul. 2, 2009

(65) Prior Publication Data
US 2010/0004085 A1 Jan. 7, 2010

(30) Foreign Application Priority Data
Jul. 3, 2008 (DE) .................. 10 2008 040 123

(51) Int. Cl.
*F16H 57/08* (2006.01)
(52) U.S. Cl. ..................................................... 475/331
(58) Field of Classification Search .............. 475/331, 475/346, 347; 74/409, 411, 439, 440
See application file for complete search history.

(56) References Cited

U.S. PATENT DOCUMENTS

| | | | | |
|---|---|---|---|---|
| 3,482,470 A * | 12/1969 | Miller | | 475/276 |
| 6,481,553 B1 * | 11/2002 | Lee | | 192/70.2 |
| 8,070,632 B2 * | 12/2011 | Yuan | | 474/94 |
| 2002/0169050 A1 * | 11/2002 | Gehring et al. | | 475/331 |
| 2006/0089228 A1 * | 4/2006 | Nakagawa et al. | | 475/286 |
| 2006/0287152 A1 * | 12/2006 | Bishop et al. | | 475/159 |
| 2007/0149346 A1 * | 6/2007 | Onishi et al. | | 475/331 |
| 2011/0111917 A1 * | 5/2011 | Heitzenrater et al. | | 475/331 |

FOREIGN PATENT DOCUMENTS

| | | |
|---|---|---|
| DE | 22 24 650 A | 3/1973 |
| DE | 101 22 585 A1 | 11/2002 |
| DE | 11 2004 000 119 B4 | 1/2008 |
| EP | 08 51 149 A1 | 7/1998 |
| JP | 58000634 * | 1/1983 |
| WO | 03/0 76 825 A2 | 9/2003 |

* cited by examiner

*Primary Examiner* — David D Le
*Assistant Examiner* — Huan Le
(74) *Attorney, Agent, or Firm* — Davis & Bujold, PLLC

(57) ABSTRACT

A transmission device (1) having at least one planetary gearset (2) and at least one frictional shift element (3) by which a ring gear (4), of the planetary gearset (2), can be connected to a component (5) that is fixed to a transmission housing. The ring gear (4) of the planetary gearset (2) is at least partially radially arranged within an inner disk carrier (6) of the shift element (3). The ring gear (4) and the inner disk carrier (6) are supported on a main transmission shaft (7) by a common carrier element (8). The ring gear (4) and the inner disk carrier (6) are radially separated from one another at least over a certain area.

15 Claims, 11 Drawing Sheets

TRANSMISSION DEVICE WITH AT LEAST ONE PLANETARY GEARSET AND A FRICTIONAL SHIFT ELEMENT

This application claims priority from German patent application serial no. 10 2008 040 123.4 filed Jul. 3, 2008.

FIELD OF THE INVENTION

The invention concerns a transmission device with at least one planetary gearset and a frictional shift element.

BACKGROUND OF THE INVENTION

A transmission device 1 known from the prior art and having at least one planetary gearset 2 and at least one frictional shift element 3 is shown in partial longitudinal section in FIG. 1. A ring gear 4 of the planetary gearset 2 can be connected, via the frictional shift element 3, to a component 5 fixed on the housing, and the ring gear 4 of the planetary gearset 2 and an inner disk carrier 6 of the shift element 3 are made integrally and are supported by a common carrier element 8 in the area of a main transmission shaft 7.

A disadvantage of this, however, is that during operation of the transmission device 1 operational noise produced in the area of the planetary gearset 2, in particular from the area of the teeth of the ring gear 4, is transmitted into the inner disk carrier 6, into a disk set 10 of the frictional shift element 3, and from there into the component 5 fixed on the housing and hence to the transmission housing of the transmission device 1. The noise conducted into the transmission housing 5 is passed on into the body of a vehicle built with the transmission device 1 and interferes with driving comfort to an undesired extent.

In addition, the common carrier element 8 in the area of the main transmission shaft 7 is mounted only on axial bearings, so that the ring gear 4 is only radially conducted in the area of its teeth that engage with the planetary gears 9 of the planetary gearset 2. When low load torques act in the area of the ring gear 4, for example in load-free gear ratios of the transmission device 1, the result is that owing to its own weight or other disturbing forces the ring gear 4 sinks with its own tooth profile 22 into the tooth profile of the planetary gears 9, sometimes entering into so-termed two-sided contact. If the shift element 3 is engaged because a gear change has been called for in the transmission device, this mispositioning in the area of the planetary teeth and the teeth 22 of the ring gear is 'frozen' into place and during operation of the transmission device 1 undesirably loud gearing noise is produced in the area of the planetary gearset 2.

SUMMARY OF THE INVENTION

Accordingly, the purpose of the present invention is to further develop the transmission device known from the prior art, at least so that the transfer of noise from the area of the planetary gearset toward the transmission housing is reduced.

In the transmission device according to the invention with at least one planetary gearset and at least one frictional shift element, by which a ring gear of the planetary gearset can be connected to a component fixed on the housing, such that the ring gear of the planetary gearset is at least partially arranged radially within an inner disk carrier of the shift element and the ring gear and the inner disk carrier are supported in the area of the main transmission shaft by a common carrier element, the ring gear and the inner disk carrier are a distance apart from one another in the circumferential direction, at least over a certain area.

Thus, compared with the transmission device known from the prior art, the transmission area for noise produced in the area of the planetary gearset, for example by the vibrating ring gear, is smaller and driving discomfort is reduced to a smaller extent.

In an advantageous further development of the transmission device according to the invention, the ring gear is connected in a rotationally fixed manner to the carrier element by means of axial crown gearing and a circlip, in such manner that in the area of the outer enveloping surface of the ring gear and an inner enveloping surface of the inner disk carrier of the frictional shift element there is essentially no component-to-component contact and the body noise from the planetary gearset can still be transmitted in the direction of the frictional shift element essentially only in the area of the crown gearing of the ring gear. Compared with the transmission device known from the prior art, in the transmission device according to the invention the noise transmission area can preferably be reduced to a tenth as much such that the enveloping surface of the ring gear of the planetary gearset, greatly affected by vibrations, essentially no longer makes any contact with the inner enveloping surface of the inner disk carrier of the shift element.

In a further advantageous embodiment of the transmission device according to the invention, the extent to which noise from the planetary gearset is transmitted in the direction of the frictional shift element is reduced still further by providing a clearance fit between the axial crown gearing and axial gaps of the carrier element, through which the teeth of the crown gearing of the ring gear can pass through the carrier element.

In a further embodiment of the transmission device according to the invention, which is easy to assemble and to produce, the inner disk carrier of the frictional shift element and the carrier element are made integrally, as one piece.

To guide the ring gear of the planetary gearset specifically in the radial direction, in a further advantageous embodiment of the transmission device according to the invention, the carrier element is mounted on the main transmission shaft by means of a radial bearing. In a structurally simple and inexpensive manner this additional radial mounting of the carrier element on the radial bearing prevents the ring gear from sinking into the tooth profile of the planetary gears when low load torques act in the area of the ring gear, and thus prevents mispositioning in this area and the occurrence of gearing noise that reduces the driving comfort. The radial bearing can preferably be made as a slide bearing or a roller bearing.

To increase the rotation speed strength of the inner disk carrier, in an advantageous further development of the transmission device according to the invention, the inner disk carrier, in an end area thereof facing away from the carrier element, has a cylindrical end contour such that the rotationally fixed disk profile of the disk carrier of the frictional shift element can preferably be produced by the segment shaping method according to Müller-Weingarten, the stamping method according to Grob or by profile rolling with smaller rolls according to Müller-Weingarten.

In another advantageous embodiment of the transmission device according to the invention, maximum transmission capacity, via the crown gearing, is ensured by having a number of teeth of the crown gearing of the ring gear that is the same as the number of gaps of the carrier element through which the teeth of the ring gear's crown gearing can pass through the carrier element.

To accommodate the planetary gearset, the frictional shift element and the carrier element, that supports the ring gear, and the inner disk carrier, all within a restricted radial space, in a further advantageous embodiment of the transmission device according to the invention, the axial crown gearing is synchronized with the teeth of the inner disk carrier and a quotient of the number of teeth of the inner disk carrier and the number of teeth of the axial crown gearing of the ring gear is a whole-number multiple, the maximum transmission capacity being achieved with a quotient equal to 1.

In an advantageous further development of the transmission device according to the invention, the carrier element is a casting and formed with a cast steel insert in an axial contact area of the teeth of the ring gear to increase its strength.

In a further advantageous embodiment of the transmission device according to the invention, an elastomer is at least partially arranged in the circumferential and radial direction of the area delimited by the ring gear and the inner disk carrier, for additional body noise reduction.

In such a case, in a further development of the transmission device according to the invention, the elastomer contacts, with its inner side that faces toward the outer enveloping surface of the ring gear, the outer enveloping surface of the ring gear, so that vibrations of the ring gear that occur during operation of the transmission device are damped.

To dampen operational-related vibrations of the inner disk carrier, in a further embodiment of the transmission device according to the invention, the elastomer, with its outer side that faces toward the inner enveloping surface of the inner disk carrier, is in contact with the inner enveloping surface of the inner disk carrier.

To increase the contact area between the inner side of the elastomer and the outer enveloping surface of the ring gear, in an advantageous further development of the transmission device according to the invention, the elastomer is formed with a profile in the area of its inner side, and with this, engages in a profile of the outer enveloping surface of the ring gear. In a simple manner this improves the certainty that during operation of the transmission device the elastomer will remain in its fitted position between the ring gear and the inner disk carrier, compared to a smooth shape of the inside of the elastomer and the outside of the ring gear.

In a further advantageous embodiment of the transmission device according to the invention, this assurance is increased by shaping the elastomer in its outside area with a profile which engages in a profile of the inner enveloping surface of the inner disk carrier, since in this embodiment too, the contact area between the elastomer and the inner disk carrier is increased.

Other advantages and advantageous further developments of the invention emerge from the claims and from the embodiments whose principle is described with reference to the drawing. For the sake of clarity, in the description of the embodiments the same indexes are used for components with the same structure and function.

DETAILED DESCRIPTION OF THE PREFERRED EMBODIMENTS

Figure 1:
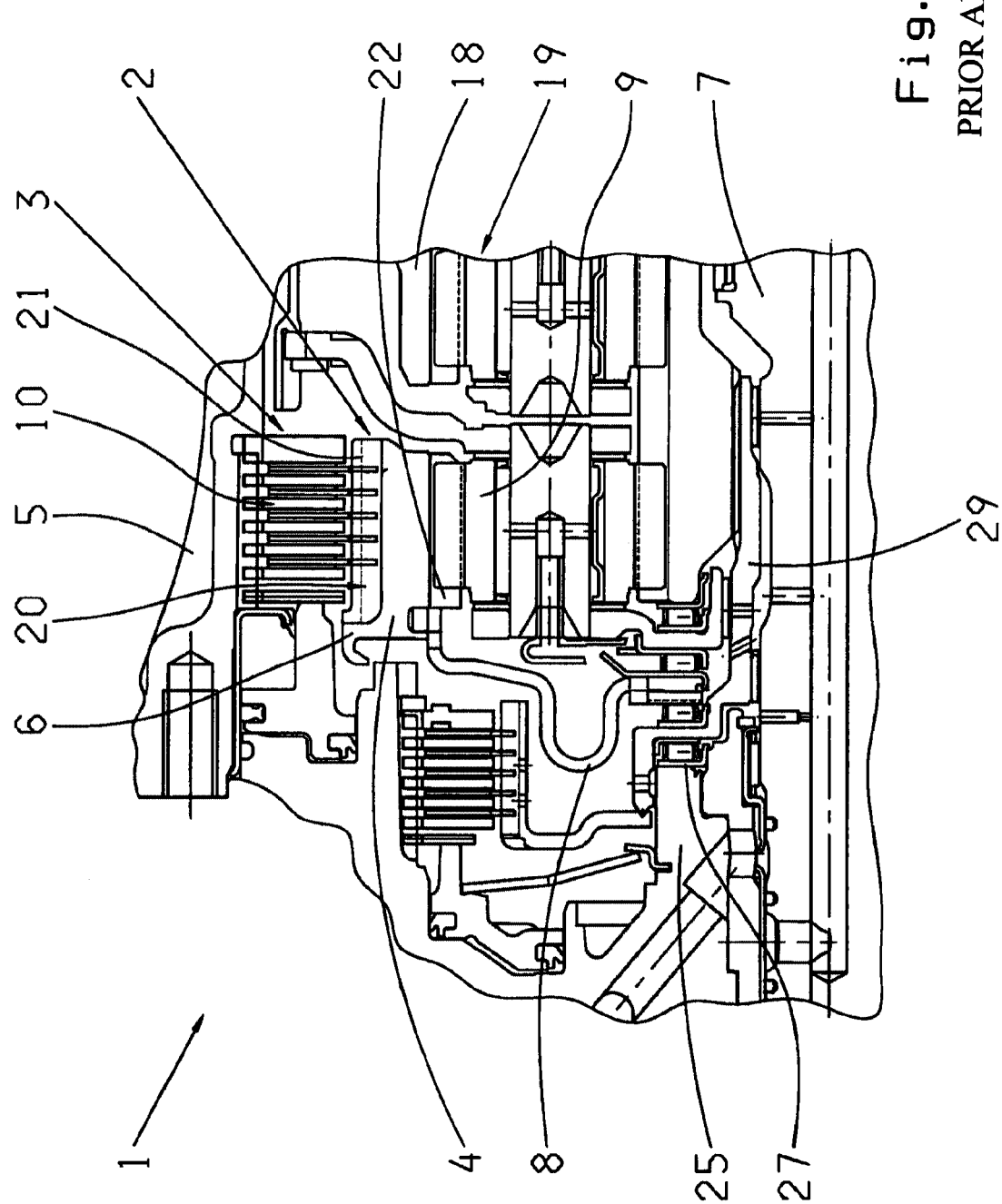
FIG. 1: Partial longitudinal section of a transmission device known from the prior art.
Figure 2:
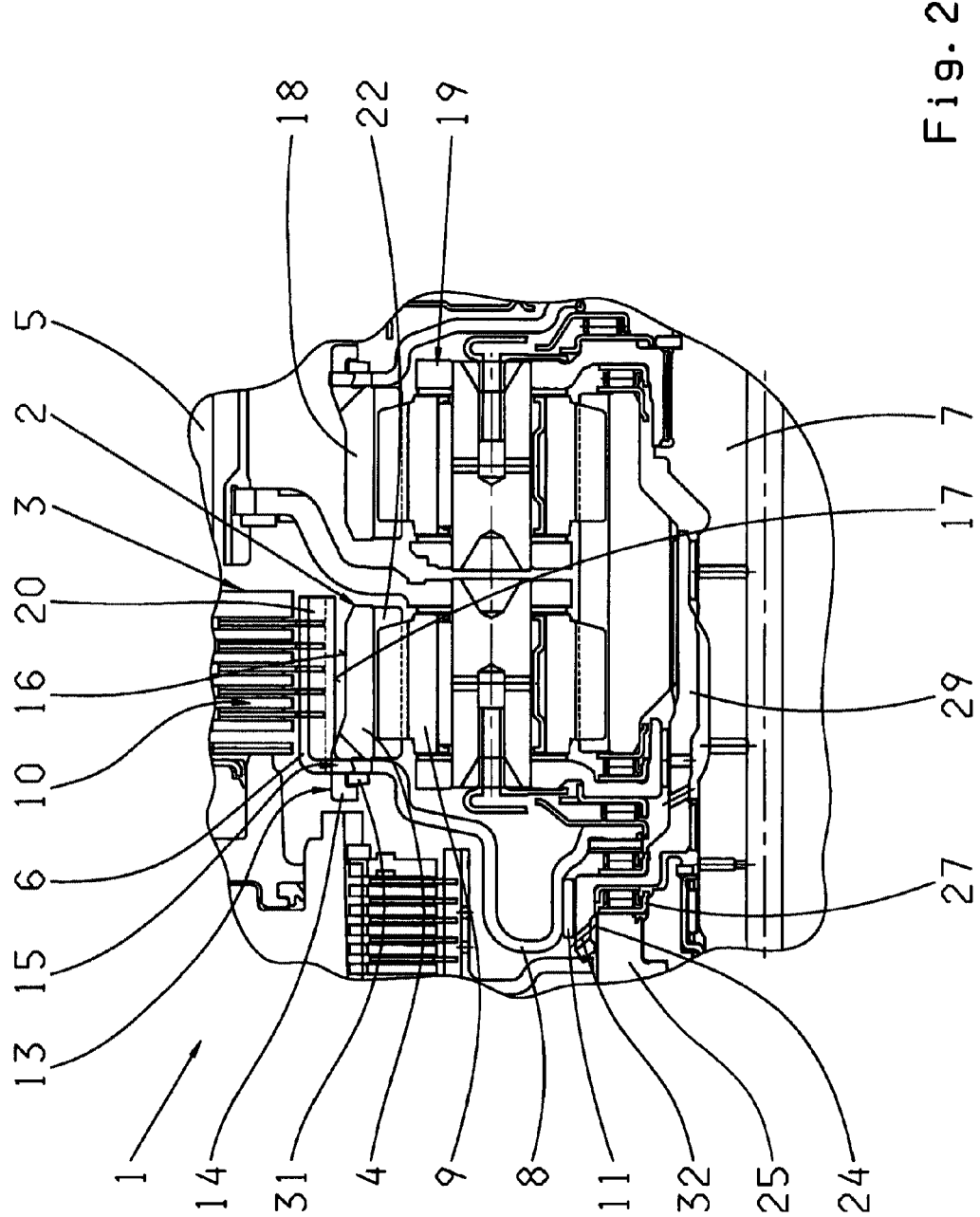
FIG. 2: View, similar to FIG. 1, of a transmission device according to the invention.

FIG. 2 shows a first embodiment of the transmission device 1 according to the invention, which differs from the transmission device 1 known from the prior art and illustrated in FIG. 1 essentially in the area of the inner disk carrier 6 and the ring gear 4 of the planetary gearset 2 and in the area of the carrier element 8, the latter, in the transmission device 1 of FIG. 2, being radially supported by a radial bearing 11 on a sun gear shaft 29 of the planetary gearset 2, which is in turn radially supported on the main transmission shaft 7. Thus, the carrier element 8 is indirectly radially supported on the main transmission shaft 7. In a different design the carrier element 8 could even be radially supported directly on the main transmission shaft 7.

Figure 3:
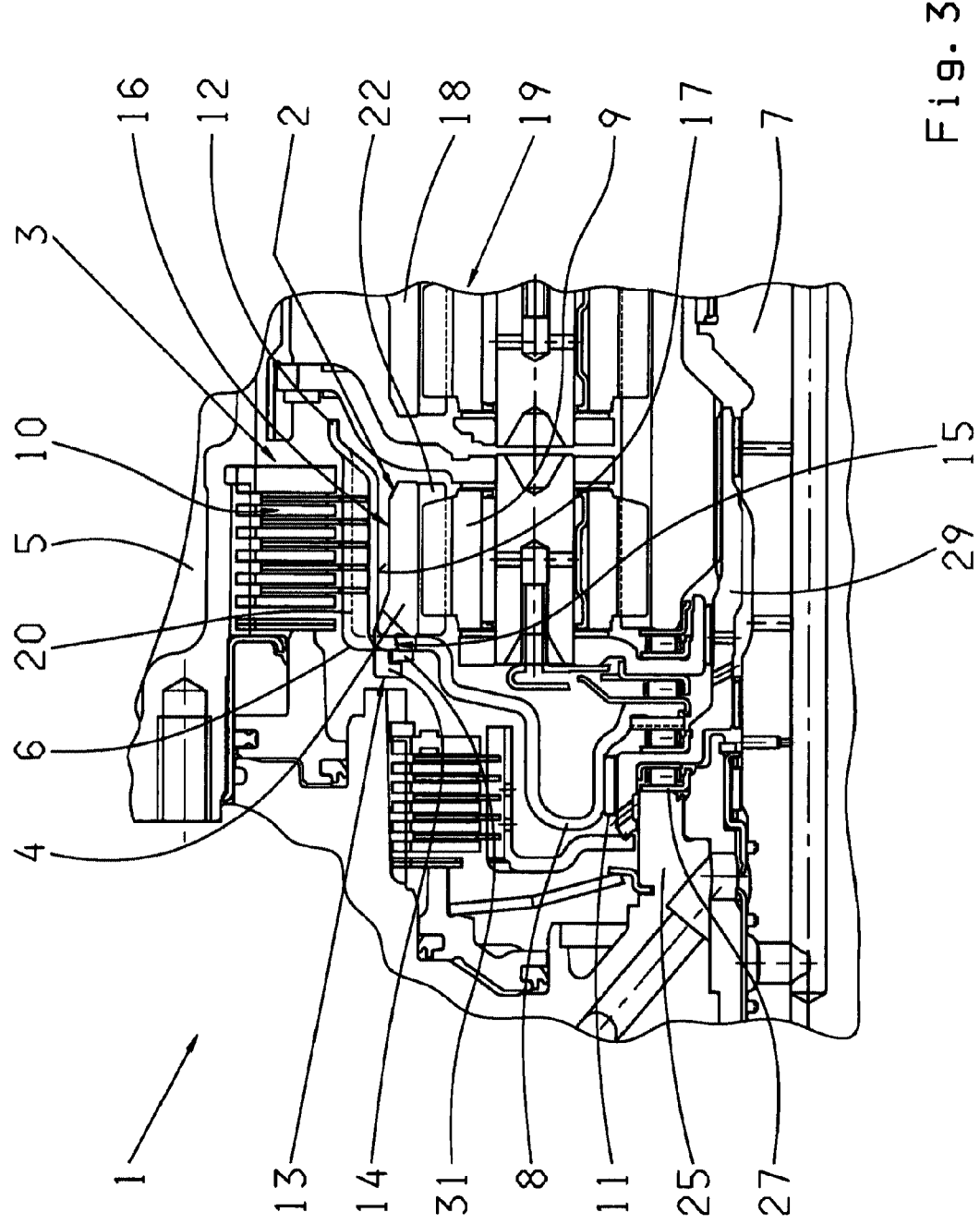
FIG. 3: View, similar to FIG. 1, of a second embodiment of the transmission device according to the invention.

FIG. 3 shows a second embodiment of the transmission according to the invention, which differs in the area of the inner disk carrier 6 from the transmission device 1 in FIG. 2 in having a cylindrical end contour 12 in the area of the end facing away from the carrier element 8, the cylindrical end contour 12 improves the rotation speed strength of the disk profile of the inner disk carrier 6 compared with the design of the inner disk carrier 6 in FIG. 2.

Both in the transmission device 1 of FIG. 2 and in the transmission device 1 of FIG. 3, the inner disk carrier 6 of the frictional shift element 3 is integrally made with the carrier element 8, in the form of a stamped sheet component. The ring gear 4 of the planetary gearset 2 is connected in a rotationally fixed manner to the carrier element 8 by means of axial crown gearing 13, whose teeth 14 pass through the carrier element 8 in the area of gaps 15, and by means of a circlip 31. A clearance fit is provided between the teeth 14 of the axial crown gearing 13 and the gaps 15 of the carrier element 8. In addition, an outer enveloping surface 16 of the ring gear 4 is greatly radially spaced from an inner enveloping surface 17 of the disk carrier 6, so that between the inner disk carrier 6 and the ring gear 4 there is essentially no component-to-component contact for noise transmission from the planetary gearset 2 toward the frictional shift element 3 and from there to the transmission housing 5 of the transmission device 1.

Component noise produced during operation of the transmission device in FIGS. 2 and 3, in both versions, starts from the planetary gearset 2 and is only further transmitted in the area of the axial crown gearing 13 into the carrier element 8 and hence to the inner disk carrier 6, and from there to the disk set 10 of the frictional shift element 2, so that compared with the transmission device 1 in FIG. 1, known from the prior art, noise in the transmission area is considerably reduced. In the transmission device 1 of FIG. 2 and also that of FIG. 3, the outer enveloping surface 16, which is strongly affected by vibrations during operation, no longer directly contacts the disk set 10 of the frictional shift element 3.

Compared with the transmission device 1 of FIG. 1, in the transmission device 1 according to the invention shown in FIG. 2 and FIG. 3 the area transmitting component noise is reduced to one-tenth by the above-described connection of the ring gear 4 to the carrier element 8 by means of the axial crown gearing 13.

In contrast to the transmission device 1 of FIG. 1, the ring gear 4 of the transmission device 1 in FIG. 2 and FIG. 3 is guided in the radial direction with precision by the additional radial bearing 11 of the carrier element 8, and in the event of low load torques acting in the area of the ring gear 4, the latter no longer sinks into the teeth of the planetary gears 9 of the planetary gearset 2. This prevents mispositioning of the annular gear 4 with respect to the planetary gears 9, so that gearing noise is avoided in a simple and inexpensive manner. In the present case, the radial bearing is a slide bearing, but depending on the application concerned, it can also be a roller bearing.

In addition, the above-described design of the ring gear 4 of the planetary gearset 2 as a separate component connected, via the axial crown gearing 13, to the carrier element 8 offers the possibility of making the ring gear 4 in the same manner as a ring gear 18 of a further planetary gearset 18 or used as a cross-over part, whereby the production costs of the transmission device 1 according to the invention are reduced when compared with the transmission device 1 known from the prior art.

Due to the design of the inner disk carrier 6 with its cylindrical end contour 12, the disk set 10 of the frictional shift element 3 has to be fitted before the inner disk carrier 6 is inserted.

Basically, the ring gear 4 of the planetary gearset 2 in the transmission device 1, according to FIGS. 2 and 3, is only held at one end, i.e. in the area of the axial crown gearing 13, which during operation is affected by relatively low vibration intensity. Consequently, the vibration of the ring gear 4 passes only in small measure to the sound-transmitting structure of the carrier element 8 and the inner disk carrier 6 made integrally with it. In addition, the minimal amount of contact between the axial crown gearing 13 and the carrier element 8, together with the clearance fit, favors reduced passage of component noise into the carrier element 8 and the inner disk carrier 6.

To enable the arrangement comprising of the inner disk carrier 6, the ring gear 4 and the carrier element 8 to be accommodated in the limited radial fitting space inside the transmission housing 5, the crown gearing 13 is synchronized with the teeth 20 of the inner disk carrier 6, such that for synchronization the quotient of the number of disk teeth 21 divided by the number of teeth 14 of the crown gearing 13 is a whole-number multiple and the maximum transmission capacity is achieved when the quotient equals 1. In the present case both the inner disk carrier 6 and the crown gearing 13 each have 24 teeth and are respectively indexed as 21 and 14.

Figure 4:
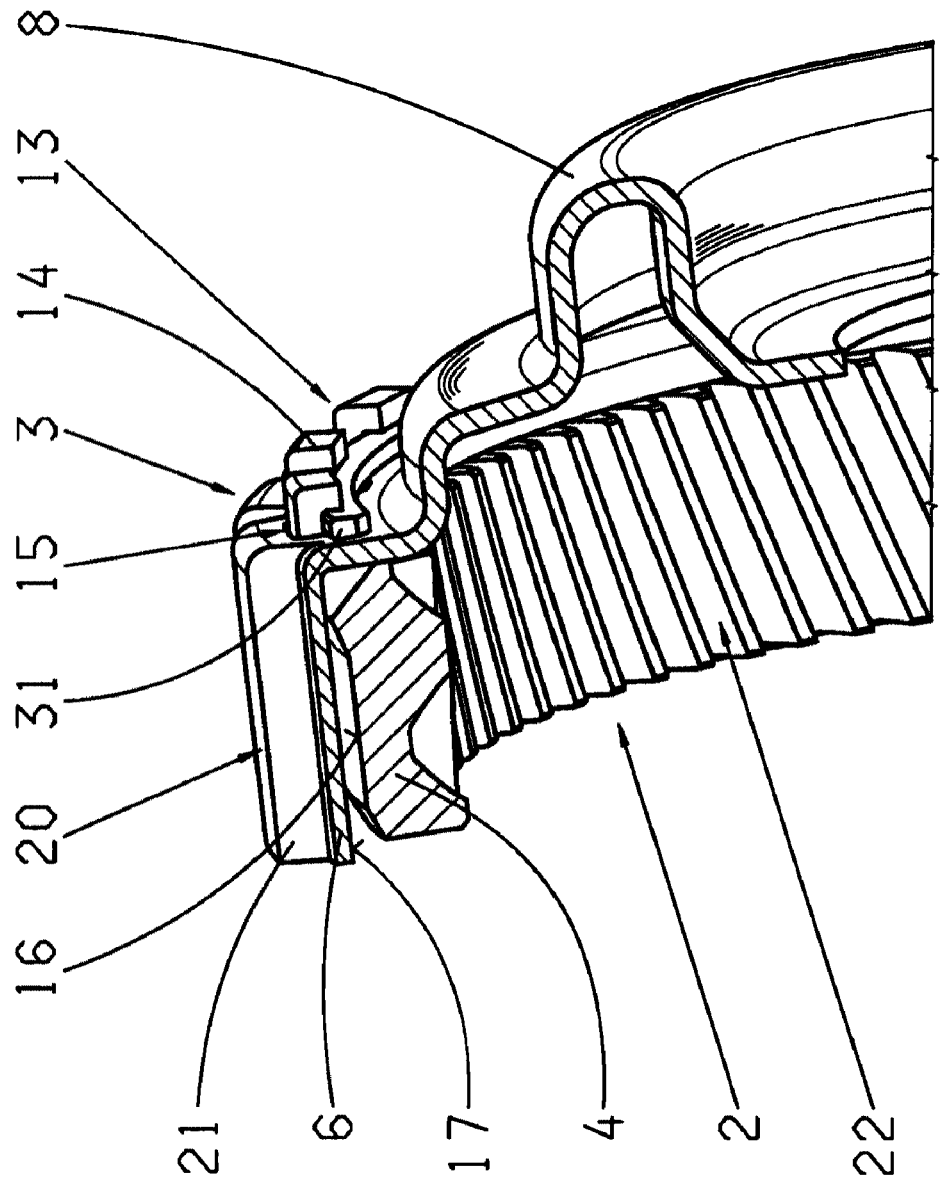
FIG. 4: Partial cross-section of an inner disk carrier of a frictional shift element and a ring gear of a planetary gearset of the transmission device according to the invention shown in FIGS. 2 and 3.
Figure 5:
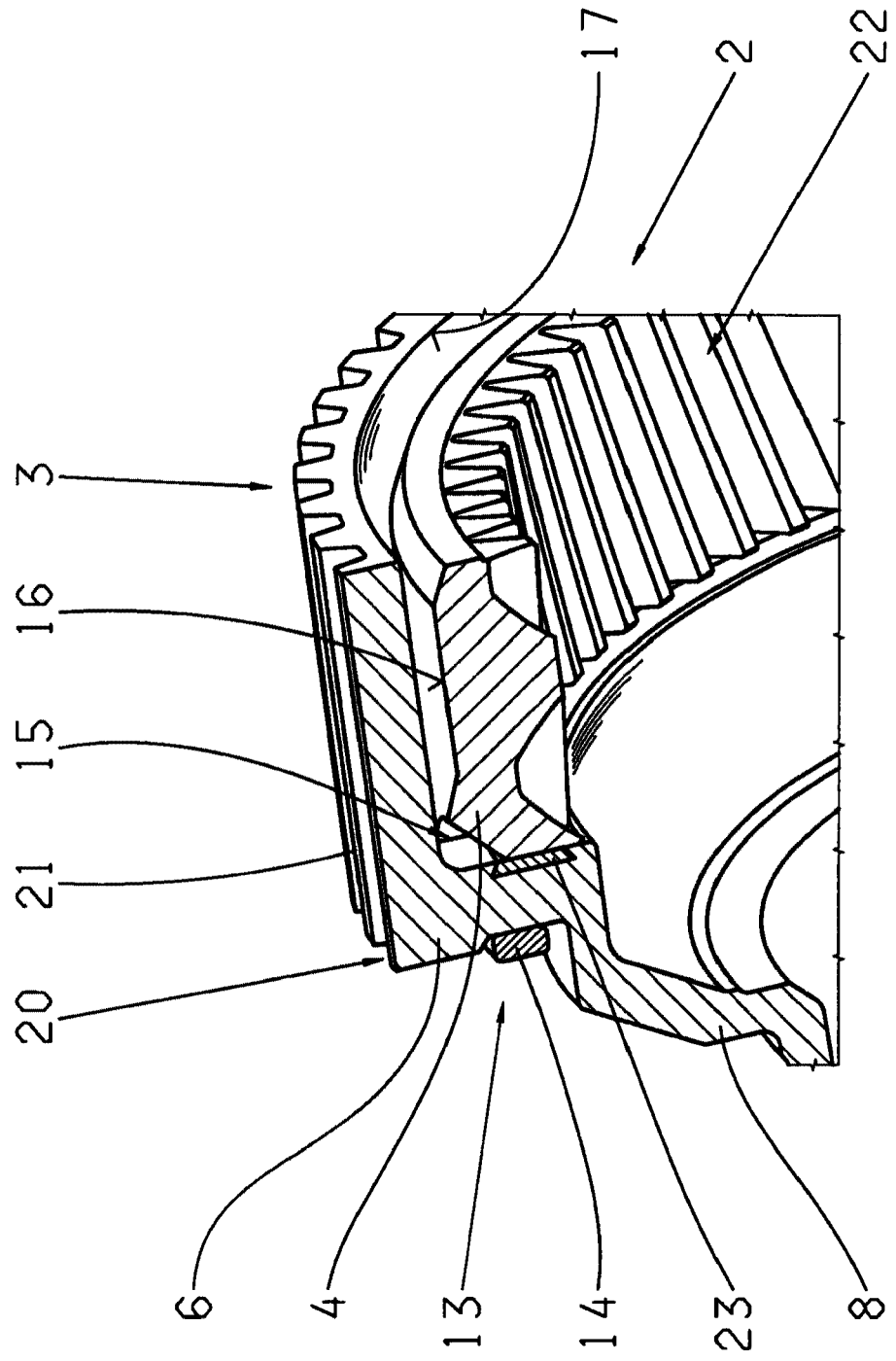
FIG. 5: View corresponding to FIG. 4, with the inner disk carrier and a carrier element made integrally with it in the form of a casting.

FIG. 5 shows a representation corresponding to FIG. 4 of the ring gear 4, the inner disk carrier 6 and part of the carrier element 8, with the inner disk carrier 6 and the carrier element 8 being a cast component. To increase its strength, in its axial contact area with a tooth array 22 of the ring gear 4 the carrier element 8 is made as a cast-in steel insert 23. Alternatively, however, a movable steel plate can be inserted. In contrast to of the carrier element 8 being designed as a shaped sheet component illustrated in FIG. 4, in the case of the carrier element 8 being designed as a casting, as in FIG. 5, it is not necessary for the quotient of the number of disk teeth 21 and the number of crown gearing 13 teeth to be a whole-number multiple.

Figure 6:
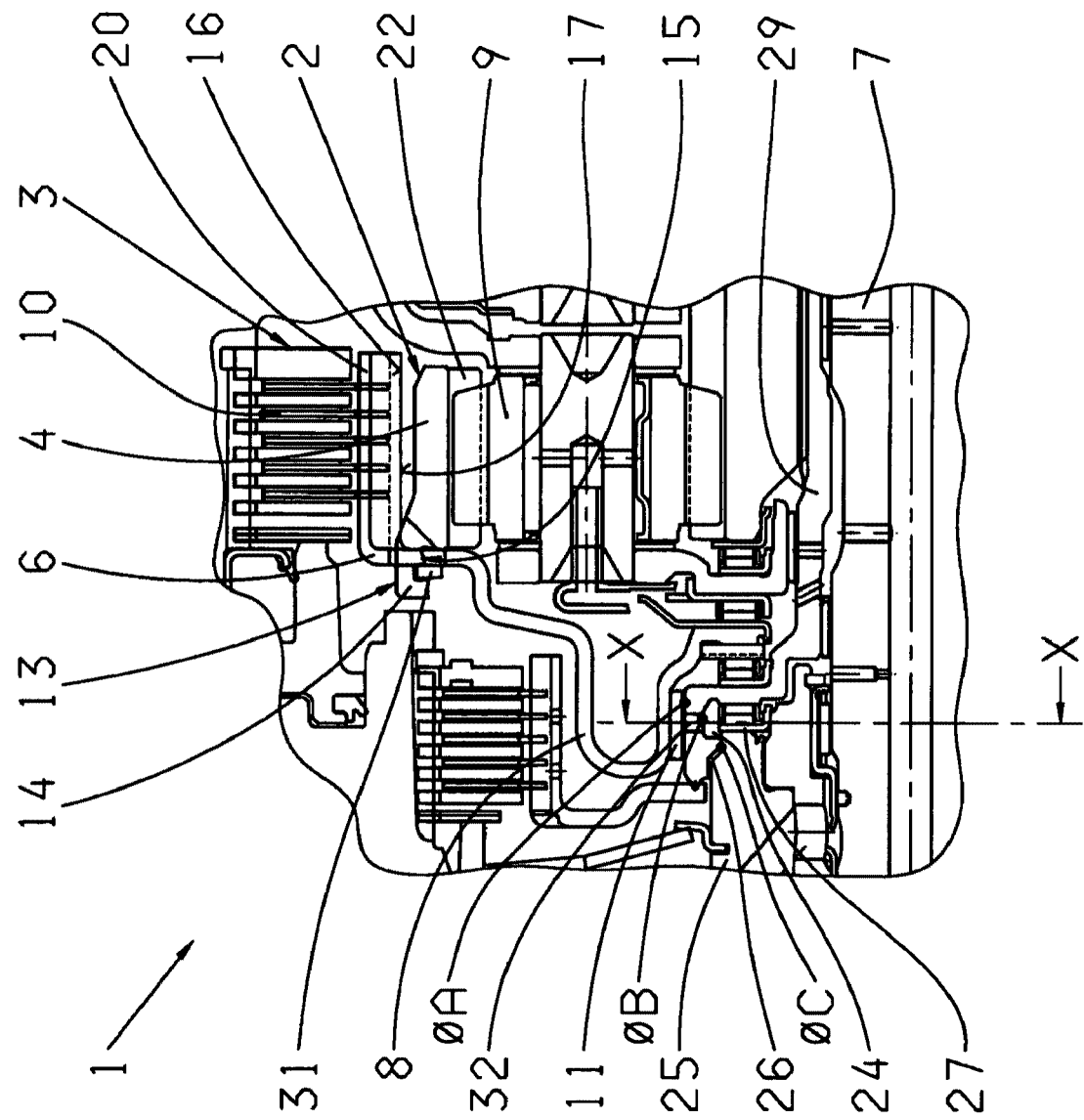
FIG. 6: View, similar to FIG. 1, of a third embodiment of the transmission device according to the invention.

FIG. 6 shows a view of the transmission device 1 according to the invention corresponding to FIG. 2, in which oil is supplied to the additional radial bearing 11 by an oil-collector groove 24 that is larger in comparison with the version in FIG. 2. For this, an intermediate plate 25 is made with a step 26 in the area of the oil-collector groove 24 and an angled plate 27 is made shorter compared with the version in FIG. 2. The oil-collector groove 24, arranged radially in the area under the radial bearing 11 on the inside diameter of the sun gear shaft 29, is in fluidic connection with the radial bearing 11 via a plurality of transverse bores 32 of the sun gear shaft 29 distributed around its circumference, so that lubrication oil flows radially from inside into the oil-collector groove 24 and is passed on to the radial bearing 11.

Figure 7:
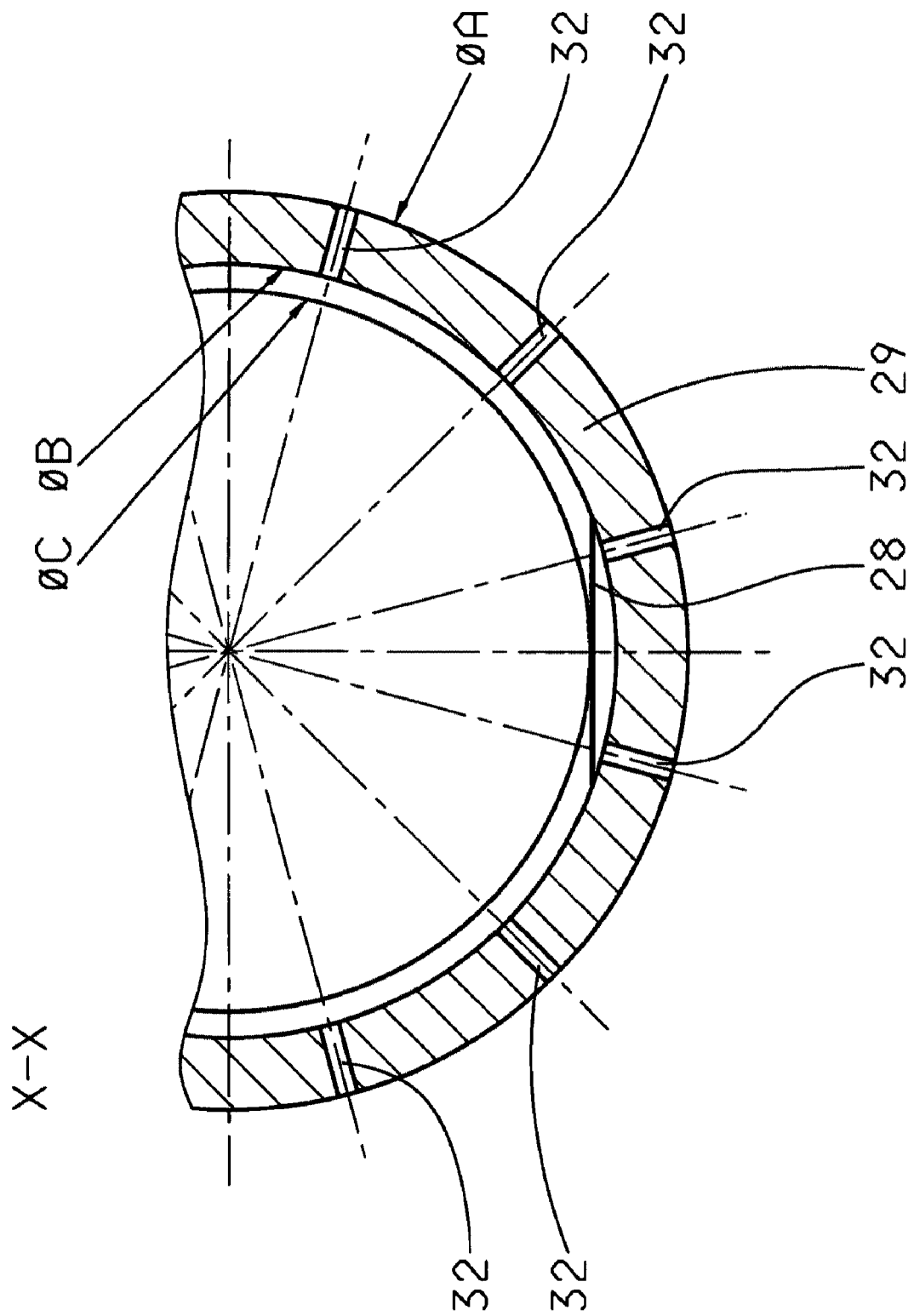
FIG. 7: Very schematic representation of a sun gear shaft of the transmission device shown in FIG. 6.

FIG. 7, which shows the section X-X through the sun gear shaft 29, indicates in more detail that an oil level 28 forms inside the transmission device 1 according to FIGS. 2, 3 and 6, this oil lever 28 being established when the sun gear shaft 29 is static in the area of its oil-collector groove 24. The indexes ØA, ØB and ØC clarify the section X-X. By matching the radial extension of the oil-collector groove 24 and the number of transverse bores 32 (or the angular distribution of the arrangement of transverse bores 32 relative to the central axis of the sun gear shaft 29), oil can be passed on to the radial bearing 11 in any fixed position of the sun gear shaft 29.

Thus, the oil feed system of the additional radial bearing 11 shown in FIG. 6, together with the oil level 28, provides an optimized supply of lubrication oil to the radial bearing 11 such that, by virtue of the optimized lubrication oil supply, delivery of hydraulic fluid to the radial bearing 11 is ensured even when the sun gear shaft 29 is in an unfavorable position.

Figure 8:
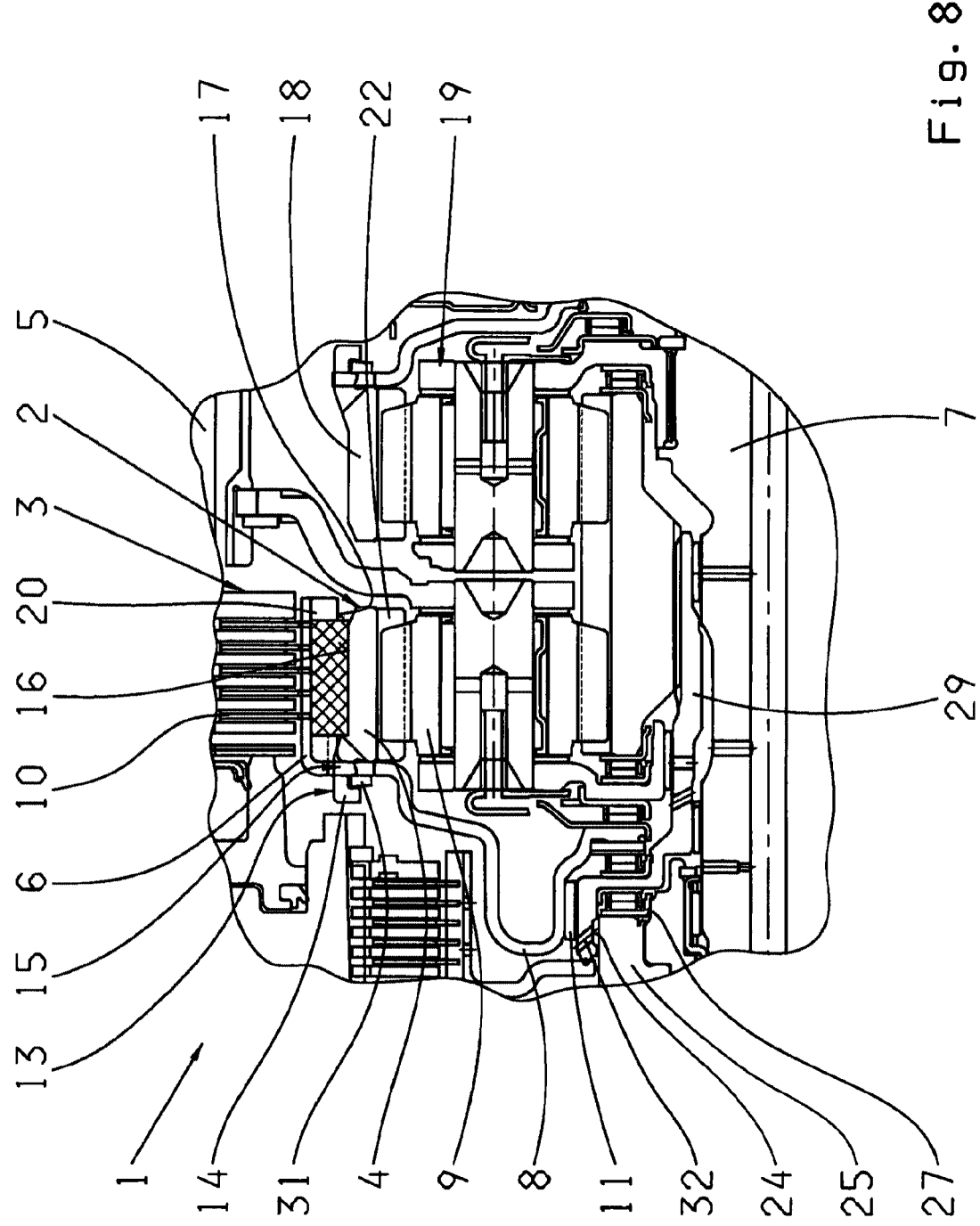
FIG. 8: View corresponding substantially to FIG. 1, of a fourth embodiment of the transmission device according to the invention.

FIG. 8 shows a fourth embodiment of the transmission device 1, which corresponds substantially to the first embodiment shown in FIG. 2 and, the area between the inner enveloping surface 17 of the inner disk carrier 6 and the outer enveloping surface 16 of the ring gear 4, is filled with an elastomer 33 for the reduction of component noise. This means that the space delimited between the ring gear 4 and the inner disk carrier 6 is filled with a rubber element or with the elastomer 33, in the manner shown in more detail in FIGS. 9 and 10.

Figure 9:
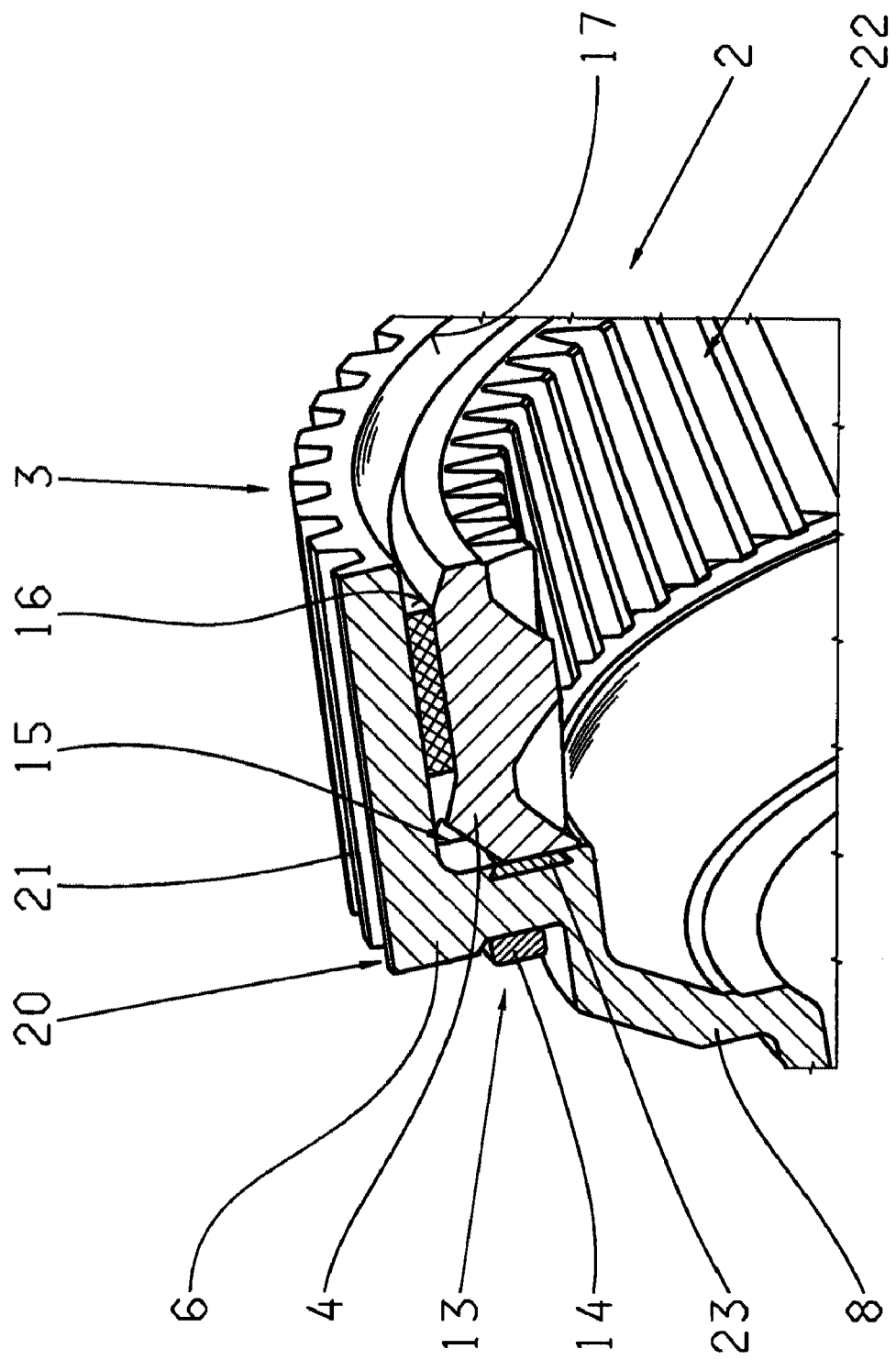
FIG. 9: View corresponding to FIG. 4, of the fourth embodiment of the transmission device according to the invention.
Figure 10:
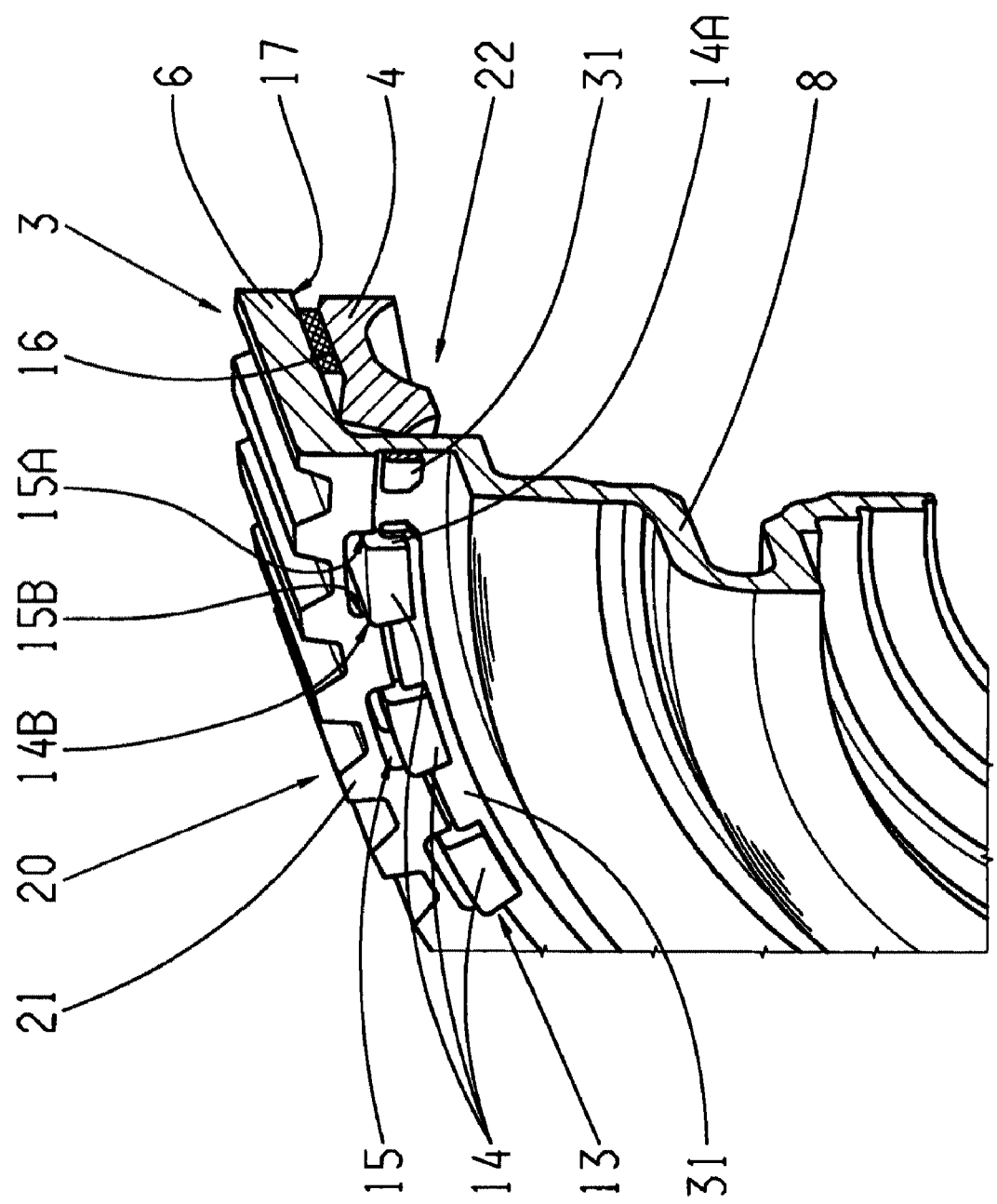
FIG. 10: Partial cross-section of the inner disk carrier of the frictional shift element and the ring gear of the planetary gearset of the transmission device shown in FIG. 8.

The fourth embodiment of the transmission device 1 shows in FIGS. 8 to 10 the elastomer 33 injected into the space between the ring gear 4 and the inner disk carrier 6.

For the process of injecting the elastomer 33 into the area between the ring gear 4 and the inner disk carrier 6, the ring gear 4, or the teeth 14 of the crown gearing 13 are orientated in relation to the gaps 15 in such a manner that the same tangential clearance exists in each case between the two tooth flanks 14A and 14B and the associated walls 15A and 15B of the gaps 15. At the same time, relative to the inner disk carrier 6, the ring gear 4 is axially positioned in such manner that the clearances between the circlip 31 and the inner disk carrier 6 and between the ring gear 4 and the inner disk carrier 6 are the same size.

Figure 12:
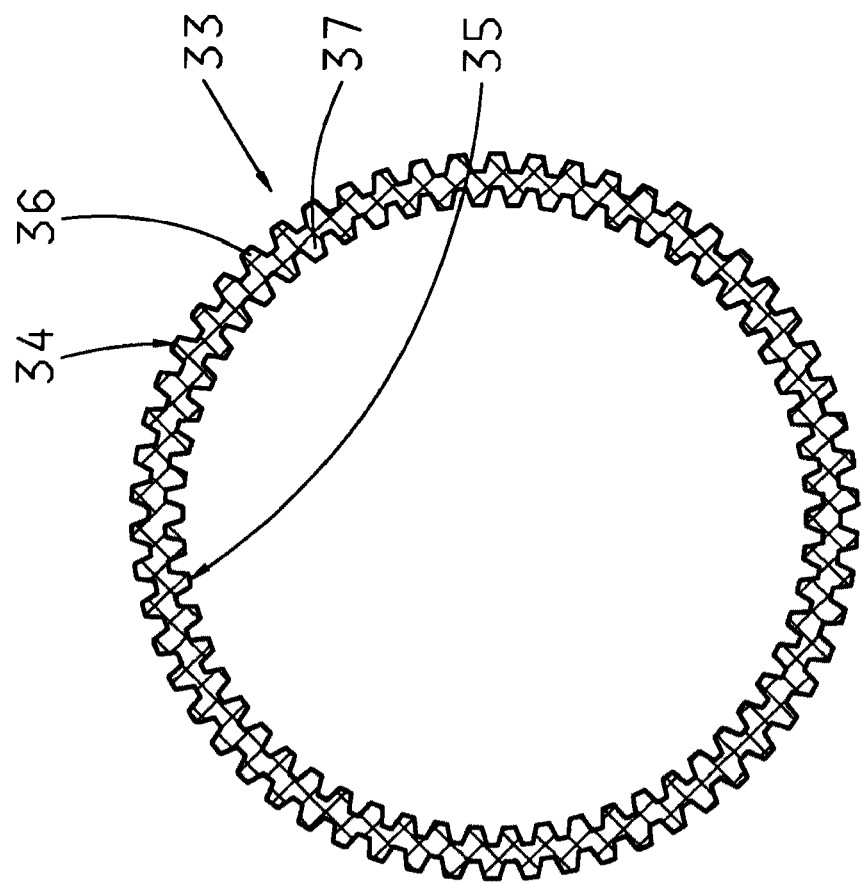
FIG. 12: Greatly simplified side view of an elastomer ring arranged between the inner disk carrier and the ring gear of the fifth embodiment of the transmission device, which is profiled both on the outside and on the inside.
Figure 11:
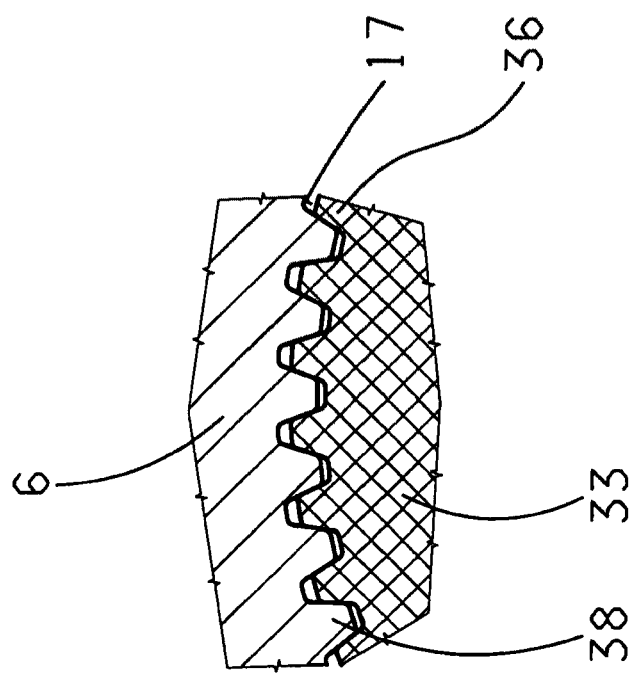
FIG. 11: Very schematic partial representation of a fifth embodiment of the transmission device according to the invention.

FIGS. 11 and 12 show parts of a fifth embodiment of the transmission device 1 according to the invention, in which the ring of elastomer 33 has respective profiles 36 and 37 both in the area of its outside 34 facing toward the inner enveloping surface 17 of the inner disk carrier 6 and in the area of its inside 35 facing toward the outer enveloping surface 16 of the ring gear 4. With its profile 36, the elastomer 33 engages in a profile 38 of the inner enveloping surface 17 of the inner disk carrier 6 as shown in detail in FIG. 11, and with its profile 37, in a manner not shown in detail, it engages in a profile of the outer enveloping surface 16 of the ring gear 4.

In this way, compared with a smooth design of the elastomer 33, in a simple manner the contact area between the outside 34 of the elastomer 33 and the inner disk carrier 6, and also the contact area between the inside 35 of the elastomer 33 and the ring gear 4, are increased, and the probability that the elastomer 33 will slide out of its assembled position between the ring gear 4 and the inner disk carrier 6 during the operation of the transmission device 1 is substantially reduced and displacement of the elastomer 33 is completely prevented.

INDEXES

1 Transmission device
2 Planetary gearset
3 Frictional shift element
4 Ring gear of the planetary gearset
5 Component fixed to the housing
6 Inner disk carrier of the frictional shift element
7 Main transmission shaft
8 Carrier element
9 Planetary gear of the planetary gearset
10 Disk set of the frictional shift element
11 Radial bearing
12 Cylindrical end contour of the inner disk carrier
13 Crown gearing
14 Teeth of the crown gearing
14A, 14B Tooth flanks
15 Gaps in the carrier element
15A, 15B Walls
16 Outer enveloping surface of the ring gear
17 Inner enveloping surface of the inner disk carrier
18 Ring gear of the further planetary gearset
19 Further planetary gearset
20 Teeth of the inner disk carrier
21 Disk teeth of the inner disk carrier
22 Teeth of the ring gear of the planetary gearset
23 Steel cast insert
24 Oil-collector groove of the sun gear shaft
25 Intermediate plate
26 Step in the intermediate plate
27 Angled plate
28 Oil level
29 Sun gear shaft
31 Circlip
32 Transverse bore of the sun gear shaft
33 Elastomer
34 Outside of the elastomer
35 Inside of the elastomer
36, 37 Profiles of the elastomer
38 Profile of the inner disk carrier
ØA, ØB,
ØC Diameter of the sun gear shaft in the area of the oil-collector groove (section X-X)

The invention claimed is:

1. A transmission device (1) comprising at least one planetary gearset (2) and at least one frictional shift element (3), by which a ring gear (4) of the planetary gearset (2) is connectable to a component (5) fixed to a transmission housing,
   the ring gear (4) of the planetary gearset (2) being arranged partially radially within an inner disk carrier (6) of the shift element (3) and the ring gear (4) and the inner disk carrier (6) being supported by a common carrier element (8) in an area of a main transmission shaft (7),
   the ring gear (4) and the inner disk carrier (6) being radially spaced from one another in a circumferential direction at least over a certain area,
   the ring gear (4) is rotationally fixed to the carrier element (8) by an axial crown gearing (13) and a circlip (31),
   a clearance fit is provided between the axial crown gearing (13) and axial gaps (15) of the carrier element (8) through which teeth (14) of the crown gearing (13) of the ring gear (4) pass through the carrier element (8), and
   a quotient of the number of teeth (21) of the inner disk carrier (6) and the number of teeth (14) of the axial crown gearing (13) of the ring gear (4) is a whole number.

2. The transmission device according to claim 1, wherein the inner disk carrier (6) and the carrier element (8) are made integrally with one another as a single component.

3. The transmission device according to claim 1, wherein the inner disk carrier (6) has a cylindrical end contour (12) in an end area facing away from the carrier element (8).

4. The transmission device according to claim 1, wherein the crown gearing (13) of the ring gear (4) has number of teeth (14) which corresponds to a number of gaps (15) of the carrier element (8).

5. The transmission device according to claim 1, wherein the carrier element (8) is supported on a sun gear shaft (29) of the planetary gearset (2) by a radial bearing (11), and the sun gear shaft (29) is radially supported on the main transmission shaft (7).

6. The transmission device according to claim 5, wherein the sun gear shaft (29) has, in an area under the radial bearing (11), an oil-collector groove (24) on an inside diameter and a plurality of circumferentially distributed transverse bores (32) that open into the oil-collector groove (24), and a radial extension of the oil-collector groove (24) is at least large enough for an oil level (28), which is established within the transmission device (1) when the sun gear shaft (29) is static, to be sufficient for oil to be delivered to the radial bearing (11) through at least one of the transverse bores (32) in substantially any angular position of the static sun gear shaft (29).

7. The transmission device according to claim 1, wherein an elastomer (33) is at least partially arranged in an area delimited, in circumferential and radial directions, by the ring gear (4) and the inner disk carrier (6).

8. The transmission device according to claim 7, wherein the elastomer (33), with its inside (35) facing toward an outer enveloping surface (16) of the ring gear (4), contacts the outer enveloping surface (16) of the ring gear (4).

9. The transmission device according to claim 8, wherein an inside area (35) of the elastomer (33) has a profile (37) which engages a profile of the outer enveloping surface (16) of the ring gear (4).

10. The transmission device according to claim 7, wherein an outer side (34) of the elastomer (33) contacts an inner enveloping surface (17) of the inner disk carrier (6).

11. The transmission device according to claim 10, wherein an outside area (34) of the elastomer (33) has a profile (36) which engages a profile (38) of the inner enveloping surface (17) of the inner disk carrier (6).

12. A transmission device (1) comprising at least one planetary gearset (2) and at least one frictional shift element (3), by which a ring gear (4) of the planetary gearset (2) is connectable to a component (5) fixed to a transmission housing, the ring gear (4) of the planetary gearset (2) being arranged partially radially within an inner disk carrier (6) of the shift element (3) and the ring gear (4) and the inner disk carrier (6) being supported by a common carrier element (8) in an area of a main transmission shaft (7), the ring gear (4) and the inner disk carrier (6) being radially spaced from one another in a circumferential direction at least over a certain area, and the carrier element (8) is a casting and has a cast-in steel insert (23) in an axial contact area of a tooth array (22) of the ring gear (4).

13. A transmission device comprising at least one planetary gearset and at least one frictional shift element, the planetary gearset comprising a ring gear and the shift element comprising an inner disk carrier, the inner disk carrier being continually connected to a radially extending common carrier element such that the inner disk carrier and the carrier element are rotationally fixed with respect to each other, an axial end of the ring gear of the planetary gearset comprises a radially extending face that directly abuts and is continually connected to the radially extending carrier element such that the ring gear and the carrier element are rotationally fixed with respect to each other, and the ring gear is axially located at least partially radially within and radially spaced from the inner disk carrier of the shift element, the ring gear is connectable, via the shift element, to a transmission housing.

14. The transmission device according to claim 13, wherein the carrier element is supported on a sun gear shaft of the planetary gearset by a radial bearing, and the sun gear shaft is radially supported on a main transmission shaft.

15. The transmission device according to claim 13, wherein the sun gear shaft has, in an area under the radial bearing, an oil-collector groove on an inside diameter and a plurality of circumferentially distributed transverse bores that open into the oil-collector groove, and a radial extension of the oil-collector groove is at least large enough for an oil level, which is established within the transmission device when the sun gear shaft is static, to be sufficient for oil to be delivered to the radial bearing through at least one of the transverse bores in substantially any angular position of the static sun gear shaft.

* * * * *